United States Patent [19]
Aki

[11] Patent Number: 5,511,438
[45] Date of Patent: Apr. 30, 1996

[54] POSITIONER

[75] Inventor: Yuichi Aki, Tokyo, Japan

[73] Assignee: Sony Corporation, Tokyo, Japan

[21] Appl. No.: 249,213

[22] Filed: May 26, 1994

[30] Foreign Application Priority Data

May 31, 1993 [JP] Japan .................................. 5-154489

[51] Int. Cl.⁶ .................................................. F16H 25/24
[52] U.S. Cl. ........................... 74/424.8 A; 74/441; 74/459
[58] Field of Search ............................... 74/424.8 A, 441, 74/459

[56] References Cited

U.S. PATENT DOCUMENTS 5,367,915  11/1994  Nishii ........................................ 74/441

FOREIGN PATENT DOCUMENTS

| 2014053 | 4/1970 | France | 74/424.8 A |
|---|---|---|---|
| 4142099 | 7/1993 | Germany | 74/441 |
| 60-196462 | 10/1985 | Japan . | |
| 61-59413 | 3/1986 | Japan . | |
| 462043 | 3/1975 | U.S.S.R. | 74/424.8 A |
| 752459 | 7/1956 | United Kingdom | 74/441 |

*Primary Examiner*—Allan D. Herrmann
*Attorney, Agent, or Firm*—Ronald P. Kananen

[57] ABSTRACT

A positioner includes a pressurizer for pressurizing an interface between a feed screw and a feed nut, and a pressure control unit for controlling pressurization so that the extent of pressurization is set to a desired value. When a backlash due to abrasion occurs between male and female threads during operation of the positioner or an error in machining precision is present between male and female threads, the extent of pressurization can be constantly maintained at a desired value.

5 Claims, 8 Drawing Sheets

POSITIONER

BACKGROUND OF THE INVENTION

1. Field of the Invention

This invention relates to a positioner, and more particularly to an improvement of a feed positioner in which, for example, a feed screw and a feed nut engaged therewith are used to linearly move a driven part coupled with the feed nut in accordance with the rotation of the feed screw.

2. Description of the Related Art

Heretofore, this type of feed positioner has been widely adopted for machine tools, measuring instruments, or the like as a device for moving an object linearly.

The feed positioner comprises a feed screw having a male thread and a feed nut having a female thread, in which the relative rotation between the feed screw and feed nut which are engaged with each other is converted into the linear movement in the axial direction of the feed screw.

The feed screw and feed nut are designed and machined so that a small clearance will be produced at a point of engagement, which is intended to minimize a variation in torque resulting from an error in machining precision or a change in dimensions due to a temperature change. A small backlash therefore occurs in a feeding direction in the feed positioner.

As a result, in the feed positioner, when the feed screw and feed nut make a relative rotation, a movement corresponding to the backlash is made in the axial direction of the feed screw irrelevant of the rotation. When rotation is reversed, immobilization may occur. Otherwise, when external force is applied in a direction in which a backlash occurs, a stop position may change or a feeding speed may change.

A method for avoiding the backlash (disclosed in Japanese Patent Lied Open No. 60-196462) is such that: one or more slots are formed to extend in the axial direction of the female thread of the feed nut; the presence of the slot or slots helps reduce the rigidity in radial direction of the female thread; and spaces between adjoining slots are narrowed by applying force to the outer circumference of the female thread, so that the male and female threads are pressurized. Thus, occurrence of a backlash is prevented.

Another method (disclosed in Japanese Patent Publication No. 61-59413) is such that: a female thread of a feed nut is divided into two sections or a feed nut has two female threads; one of two female-thread sections or female threads is separated from a feed nut support; a detent is formed; and thus a clearance between two female-thread sections or two female threads is changed a little without causing them to make a relative rotation, so that a plane between the male thread and the female-thread sections or female threads is pressurized. Thus, occurrence of a backlash is prevented.

In the above conventional methods, when a feed screw is engaged with a feed nut, a clearance for a backlash or an extent of pressurization must be adjusted.

After a prolonged use, male and female threads have worn down to change their dimensions. This results in a widened clearance between the male and female threads. Consequently, a back lash occurs between the male and female threads or the extent of pressurization decreases. This leads to deterioration of performance with the passing of time. Consequently, re-adjustment or other maintenance becomes necessary, which is a nuisance.

In another method, a clearance between male and female threads is substantially removed using a part of relatively high rigidity; such as, a tapered member, a screw, or a spacer, so that pressurization is effected. A change in dimensions due to a temperature change or an error in machining precision between male or female threads causes the clearance or extent of pressurization to change. This results in a variation in friction and torque, whereby a torsion of, for example, the axis of the male thread changes. Consequently, an error occurs in the precision of a feeding speed or a stop position.

In yet another method, the elasticity of an elastic body such as a spring is used to press a female thread to a male thread, and thus a clearance between the male and female threads is removed to pressurize the male and female threads. Herein, an extent of pressurization can somewhat be varied depending on a change in dimensions of the male or female thread. A variation in friction torque can therefore be reduced to some extent. However, this method makes it necessary to minimize the rigidity of the female thread. When the elasticity of an elastic body is increased in order to reduce the rigidity of the female thread to a level attained in the foregoing position restriction method, a variation in force relative to deformation of the elastic body becomes more intense. As a result, the extent of pressurization varies, whereby the friction torque varies. Consequently, an error occurs in the precision of a feeding speed or a stop position.

SUMMARY OF THE INVENTION

In view of the foregoing, an object of this invention is to provide a positioner in which, even when a backlash due to abrasion occurs between male and female threads or an error in machining precision is present between the male and female threads, the degree of pressurization can be constantly maintained at a desired value and thus positioning can be achieved with high precision.

The foregoing object and other objects of this invention have been achieved by the provision of a positioner 1 in which a given rotation drive means 9 rotates a feed screw 13 so that a feed nut 15 engaged with the feed screw 13 is moved relative to and in the axial direction a of the feed screw 13, and thus a driven part 2 coupled with the feed nut 15 is positioned at a desired spot. The positioner 1 includes a pressurizing means 36, 40, or 41 for pressurizing a plane between the feed screw 13 and nut 15 by pressuring the feed nut 15 in a given direction, and a pressure control means 18 for controlling pressurization so that the extent of pressurization is set to a desired value.

In this invention, the feed nut 15 has at least one slot 38 or a plurality of slots 38A to 38D which is or are machined in the radial direction of the female thread 34 to extend over the whole length or part of the female thread 34. The pressurizing means 36, 40, or 41 is shaped like an elastic tube. The diameter of the feed nut 15 is varies depending on the pressure of fluid in the tube 36, 40, or 41. Thus, pressurization is controlled.

Furthermore, in this invention, the feed nut 15 has first and second female threads 50 and 51 that do not undergo relative rotation and can freely approach or separate from each other in the axial direction of the feed screw 13. The pressurizing means 36, 40, or 41 pressures the first and second female threads 50 and 51 in the direction causing the first and second female threads 50 and 51 to approach or separate from each other, and thus pressurizes the interface between the feed screw 13 and feed nut 15 to a desired extent.

When a backlash due to abrasion occurs between male and female threads or when an error in machining precision is present between male and female threads, if a pressure associated with the backlash or error is supplied from the pressure control means 18 to the pressurizing means 36, 40, or 41, the degree of pressurization applied to the interface between the feed screw 13 and feed nut 15 can be maintained at a desired value. Thus, positioning can be achieved with high precision.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 1:
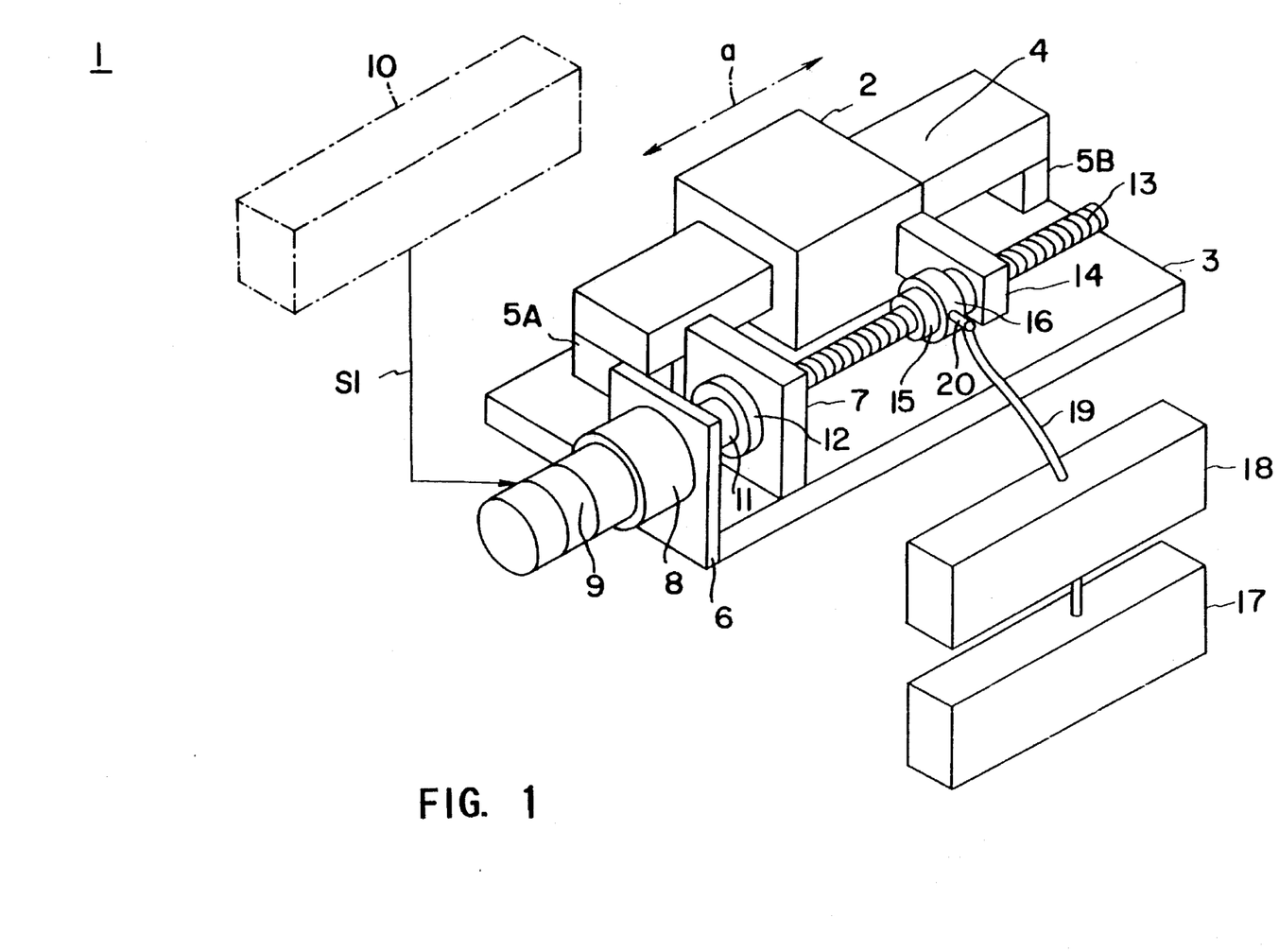
FIG. 1 is a perspective view showing an overall structure of an embodiment of a positioner according to this invention.

Preferred embodiments of this invention will be described with reference to the accompanying drawings:

In FIG. 1, 1 shows a feed positioner capable of moving a driven part 2 which is shaped like a stage, in the direction indicated by arrow "a" with high precision.

In the feed positioner 1, for example, an optical system for an optical disc base exposer is mounted on the driven part 2. The driven part 2 is then moved with high precision, so that a glass base (not shown) coated with a photoresist film is exposed to light and thus recorded tracks at intervals of a given track pitch.

In the feed positioner 1, a direct-acting guide member 4 having a parallelepiped shape is secured on a plate-like base 3 with both ends thereof supported by support legs 5A and 5B.

The driven part 2 is mounted on the direct-acting guide member 4 so as to slide in the arrow "a" direction freely. An air pressure regulator type guide mechanism or a super-precision linear rolling guide mechanism (for example, a cross roller guide) is adapted for the sliding sections of the direct-acting guide member 4 and driven part 2. The driven part 2 can therefore slide precisely in the arrow "a" direction without causing a variation in a direction orthogonal to the arrow "a" while being supported by the direct-acting guide member 4.

First and second support plates 6 and 7 are secured upright on the base 3. The first support plate 6 supports a rotation drive 9 having an accelerator-decelerator 8. The rotation drive 9 is rotated according to control signal S1 sent from a rotation control unit 10.

In the feed positioner 1, the accelerator/decelerator 8 converts the torque and rotating speed of the rotation drive 9 into desired values, and then transmits the desired values to a rotation axis coupling 11 interposed between the first and second support plates 6 and 7.

A servomotor or a stepping motor, whose rotation angle and rotating speed are controllable, is employed as the rotation drive 9. In the feed positioner 1, therefore, the rotation angle and rotating speed of the rotation drive 9 can be controlled according to the control signal S1 sent from the drive control unit 10.

The rotation axis coupling 11 is coupled with a feed screw 13 that is held by a bearing 12 mounted on the second support plate 7 so as to be freely rotatable. In the feed positioner 1, therefore, the rotation of the rotation drive 9 is transmitted to the feed screw 13 via the accelerator/decelerator 8 and rotation axis coupling 11.

The rotation axis coupling 11 is realized with a zero-backlash type bellows or a disk blade spring which provides high torsional rigidity. The rotation axis coupling 11 can therefore absorb decentering or declination occurring between the rotation drive 9 and feed screw 13, and transmits the rotation of the rotation drive 9 to the feed screw 13 accurately.

One end of the feed screw 13 is held by the bearing 12 so that it can rotate freely. The feed screw 13 is held by a coupling member 14 mounted on one side of the driven part 2 so that it can rotate freely. The feed screw 13 is therefore held with the axial direction thereof in parallel with the direct-acting guide member 4.

An air pressure regulator type bearing or a super-precision angular ball bearing is employed as the bearing 12. When the feed screw 13 rotates, the bearing 12 holds the feed screw 13 so as to prevent deflection of the axis of the feed screw 13 or displacement of the feed screw 13 in the axial direction thereof.

The feed screw 13 is engaged with a feed nut 15. The feed screw 13 and feed nut 15 constitute a sliding screw. With every turn of the feed screw 13, the feed nut 15 is moved by a pitch of the feed screw 13 in the axial direction of the feed screw 13.

The feed screw 13 and feed nut 15 have trapezoidal or triangular threads, and are made of a fine ceramic, engineering plastic, resin, or any other material of high rigidity. A lubricant, grease, or solid lubricant is applied to the sliding surfaces of the feed screw 13 and feed nut 15.

The feed nut 15 is fixed to the coupling member 14. In the feed positioner 1, therefore, when the feed nut 15 moves in the axial direction of the feed screw 13, the driven part 2 moves in the arrow "a" direction by the same distance as the distance of the movement made by the feed nut 15.

The coupling member 14 is realized with a bidirectional combined parallel blade spring having high rigidity in the arrow "a" direction and being capable of flexibly catch up with decentering, deflection, or warp of the axis of the feed screw 13, or with displacement of the feed nut 15 in a plane orthogonal to the axis of the feed screw 13 resulting from an error in parallelism between the feed screw 13 and direct-acting guide member 4. Alternatively, a bidirectional united parallel spring including a slot and an arc-shaped notch in combination may be employed as the coupling member 14.

In addition to the aforesaid components, an annular pressurizer 16 is mounted on the feed nut 15 as if it were wound around the feed nut 15.

The feed positioner 1 feeds fluid supplied by a pressure source 17 to a coupling 20 formed on the pressurizer 16 through a tube-like pressure transmission member 19 via a pressure control unit 18.

A pressure reducing valve (regulator) is employed as the pressure control unit 18. The pressure control unit 18 can therefore vary the pressure supplied by the pressure source 17 and retain a set pressure on a stable basis.

A tube made of urethane, polyester, Teflon, or the like is employed as the pressure transmission member 19. The pressure transmission tube 19 can therefore flexibly deform with the movement of the pressurizer 16 that moves together with the feed nut 15. Thus, unnecessary force or vibration is not imposed on the movable unit.

Fluid supplied to the coupling 20 is supplied to the pressurizer 16 via the coupling 20. The pressurizer 16 then tightens the feed nut 15 to the extent of corresponding to an inflow of the fluid.

As mentioned above, in the feed positioner 1, the pressure control unit 18 adjusts a pressure applied by the pressure source 17 and applies the adjusted pressure to the pressurizer 16. Thus, the force which tightens the feed nut 15 can be adjusted, and the interface pressure between the feed screw 13 and the feed nut 15 can be set to a desired value.

Figure 2:
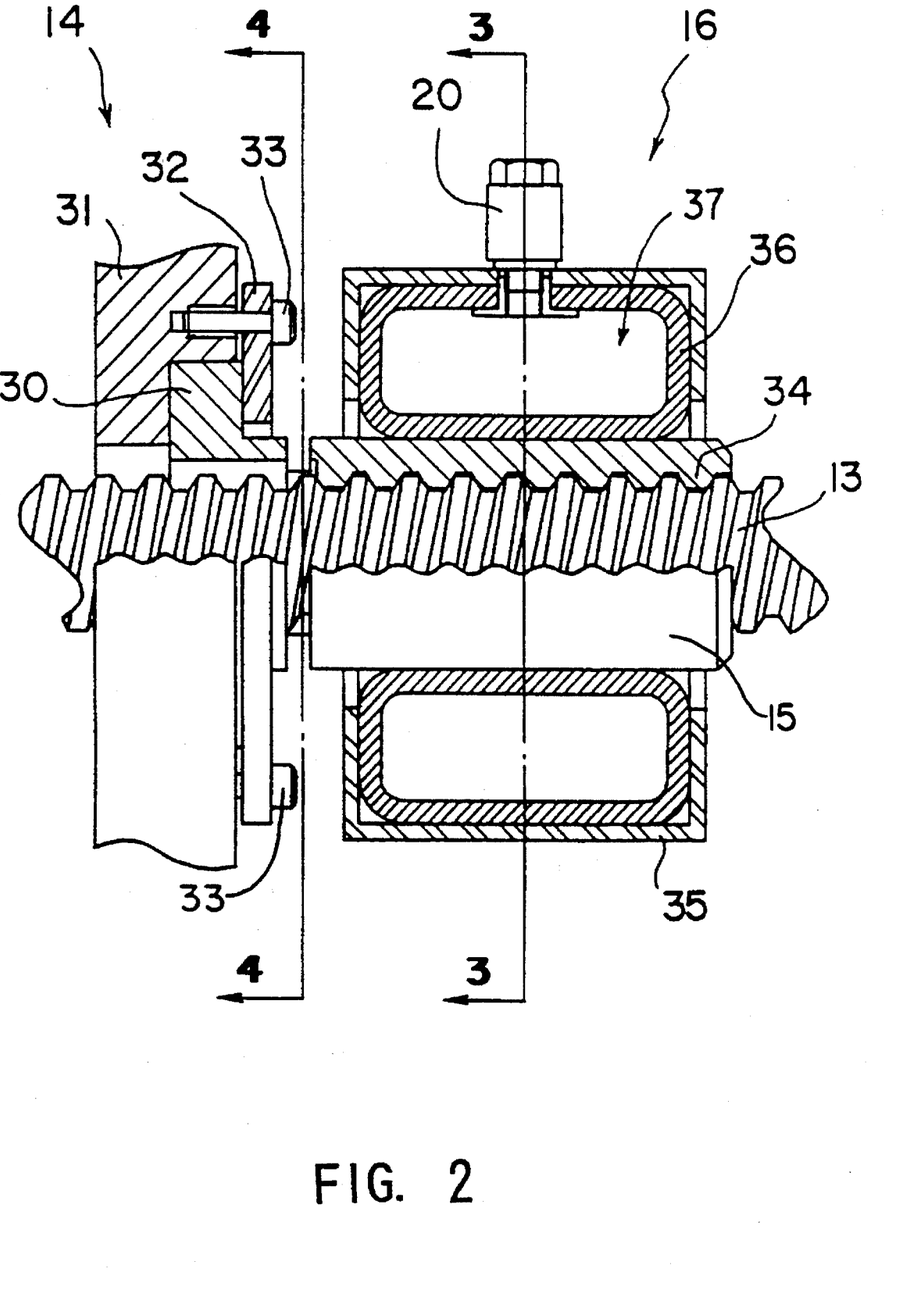
FIG. 2 is a sectional view showing a first embodiment of a pressurizer according to the present invention.

The feed nut 15 is, as shown in FIG. 2, composed of a mounting flange 30 and a female thread 34. The mounting flange 30 is fixed to a nut mounting part 31 of the coupling member 14 by tightening screws 33 with a pressing or pressure plate 32 between the nut mounting part 31 and screw 33. Thus, the feed nut 15 is mounted in the coupling member 14.

A guard ring 35 and a tube-like pressurizing member 36 disposed within the guard ring 35 are mounted on the outer circumference of the female thread 34 of the feed nut 15. The pressurizing member 36 contacts the outer circumference of the feed nut 15, and fluid flows into a hollow 37 of the pressurizing member 36 via the coupling 20.

The pressurizing member 36 is made of a resin or any other elastic or stretchable material. The pressurizing member 36 therefore dilates to the extent of corresponding to a quantity of fluid fed into the pressurizing member.

Figure 3:
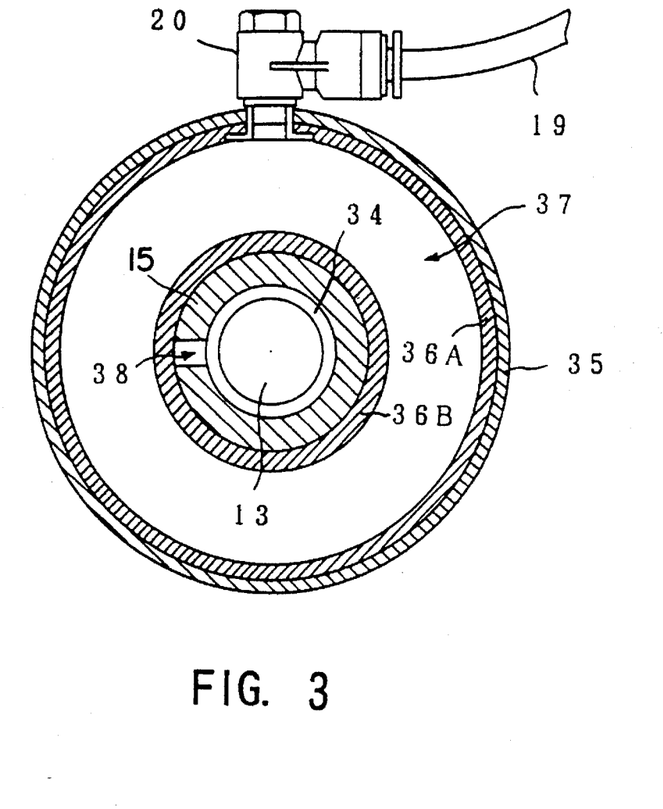
FIG. 3 is a sectional view showing a section taken along section line 3—3 of FIG. 2.

A slot 38 is, as shown in FIG. 3, machined into the feed nut 15 so as to extend in the axial direction of the feed screw 13.

When fluid is fed into the hollow 37 of the pressurizing member 36, the pressurizing member 36 dilates with the increase of the pressure in the hollow 37. At this time, the outward circumference 36A of the pressurizing member 36 is restrained by the guard ring 35, while the inward circumference 36B thereof pressures the feed nut 34 in the radial direction of the feed screw 13.

The feed nut 34 is easily deformed to the extent of corresponding to the pressure applied by the inward circumference 36B of the pressurizing member 36 because of the presence of the slot 38. The male thread of the feed screw 13 and the female thread 34 of the feed nut 15 are forced into engagement to extent corresponding to the pressure applied.

Figure 4:
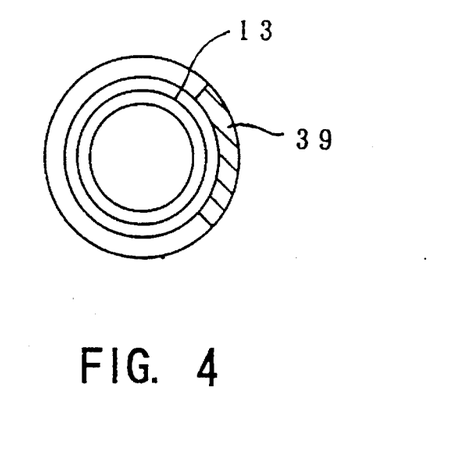
FIG. 4 is a sectional view showing a section as taken along the section line 4—4 of FIG. 2.

The female thread 34 and mounting flange 30 of the feed nut 15 are, as shown in FIG. 4, coupled with each other by means of a coupling part 39 along having an arc-shaped section. The female thread 34 is therefore easily deformed to the extent of corresponding to a pressure applied by the pressurizing member 36.

Owing to the aforesaid structure, the feed positioner 1 transmits the rotation of the rotation drive 9 into the feed screw 13 via the accelerator/decelerator 8 and rotation axis coupling 11 with high precision.

As a result, the feed nut 15 engaged with the feed screw 13 moves in an arrow "a" direction by a distance corresponding to an angle of the rotation of the feed screw 13. This causes the driven part 2 coupled with the feed nut 15 to slide in the arrow "a" direction by a distance corresponding to the distance of the movement of the feed nut 15.

The feed positioner 1 uses the pressure control unit 18 to set the pressure produced by the pressure source 17 to a desired value, and then feeds the pressure to the pressurizer 16 that is mounted as if it were wound around the feed nut 15.

The pressure control unit 18 provides the pressurizer 16 with a pressure having a value of stabilizing the pressure to the interface between the feed screw 13 and feed nut 15.

In the feed positioner 1, even when the female thread 34 is deformed locally due to an error in machining precision such as an irregular lead pitch or irregular diameter of the feed screw 13, the pressure control unit 18 can stabilize pressurization. As a result, the pressure applied to the interface between the feed screw 13 and feed nut 15 remains substantially constant. Any variation in friction torque can therefore be reduced drastically as compared with a conventional positioner. This results in improved positioning precision.

When the dimensions of the feed screw 13 or feed nut 15 are changed due to a temperature change or due to abrasion, the pressure control unit 18 pressurizes the feed nut 15 to such as extent that the pressure to the contact plane between the feed screw and feed nut 15 remains substantially constant. This results in improved positioning precision.

Since the pressurizing member 36 for pressurizing the feed nut 15 is made of a rubber or resin having a superb capability of attenuating vibration, torsional vibration due to a variation in friction torque can be converged quickly. As a result, a stick slip (chatter) occurring when the pressure to the interface between the feed screw 13 and feed nut 15 is too high can be suppressed. The feed nut 15 can therefore be fed smoothly despite a high extent of pressurization. The feeding rigidity between the feed screw 13 and feed nut 15 can thus be upgraded, resulting in improved positioning precision.

According to the aforesaid structure, the pressure control unit 18 makes it possible to set an extent of pressurization for the feed nut 15 to a desired value all the time. Even when a backlash due to abrasion occurs between male and female threads or an error in machining precision is present male and female threads, no backlash occurs between the feed screw 13 and feed nut 15. Furthermore, a variation in friction torque can be minimized. Consequently, the feed positioner 1 offers markedly improved feed positioning precision.

In the above embodiment, the feed positioner 1 is used as a device for moving an optical system for an optical disc base exposer. However, this invention is not only limited to this, but may apply to a feeder for feeding a rotation axis with a glass base mounted.-The feed positioner 1 may also be used as a device for feeding an optical system or an object to be exposed in an exposer (stepper), which exposes an object to be exposed to light representing a mask pattern for a semiconductor or liquid crystal, accurately in predetermined steps. The feed positioner 1 can also be used as a device for feeding an object linearly in machine tools or measuring instruments.

Figure 5:
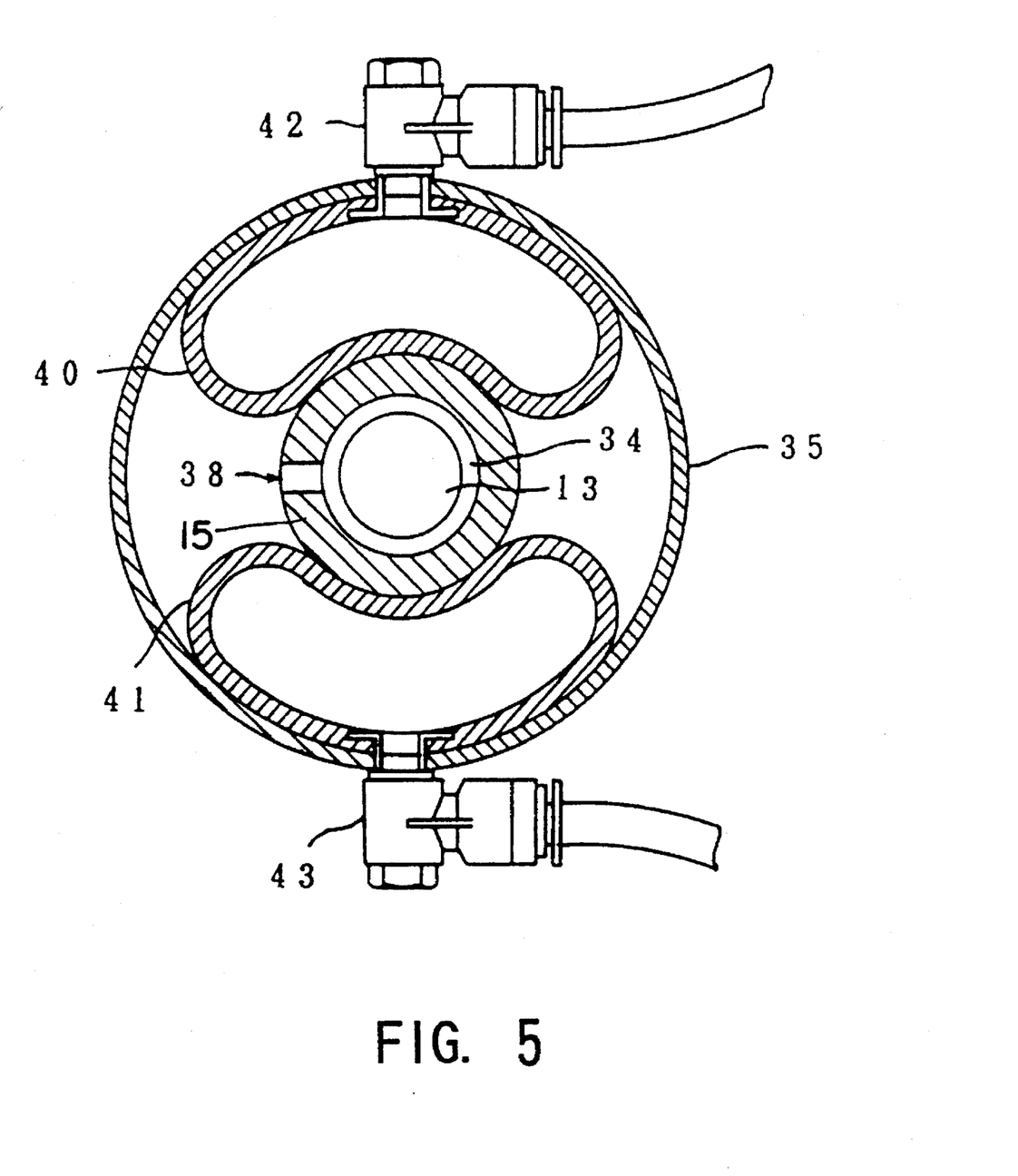
FIG. 5 is a sectional view showing pressurizing members according to a second embodiment of the present invention.

In the above embodiments, the tube-like pressurizing member 36 is disposed in the guard ring 35. Fluid whose pressure is controlled, is led into the pressurizing member 36 via the coupling 20, so that the female thread 34 of the feed nut 15 is pressurized uniformly over the circumference of the female thread 34. However, this invention is not only limited to this, but as shown in FIG. 5, two tube-like pressurizing members 40 and 41 may be used instead of the pressurizing member 36. Fluid is led independently into the pressurizing members 40 and 41 via couplers 42 and 43, so that the female thread 34 is pressured on mutually-opposed sides thereof with the slot 30 between them.

Figure 6:
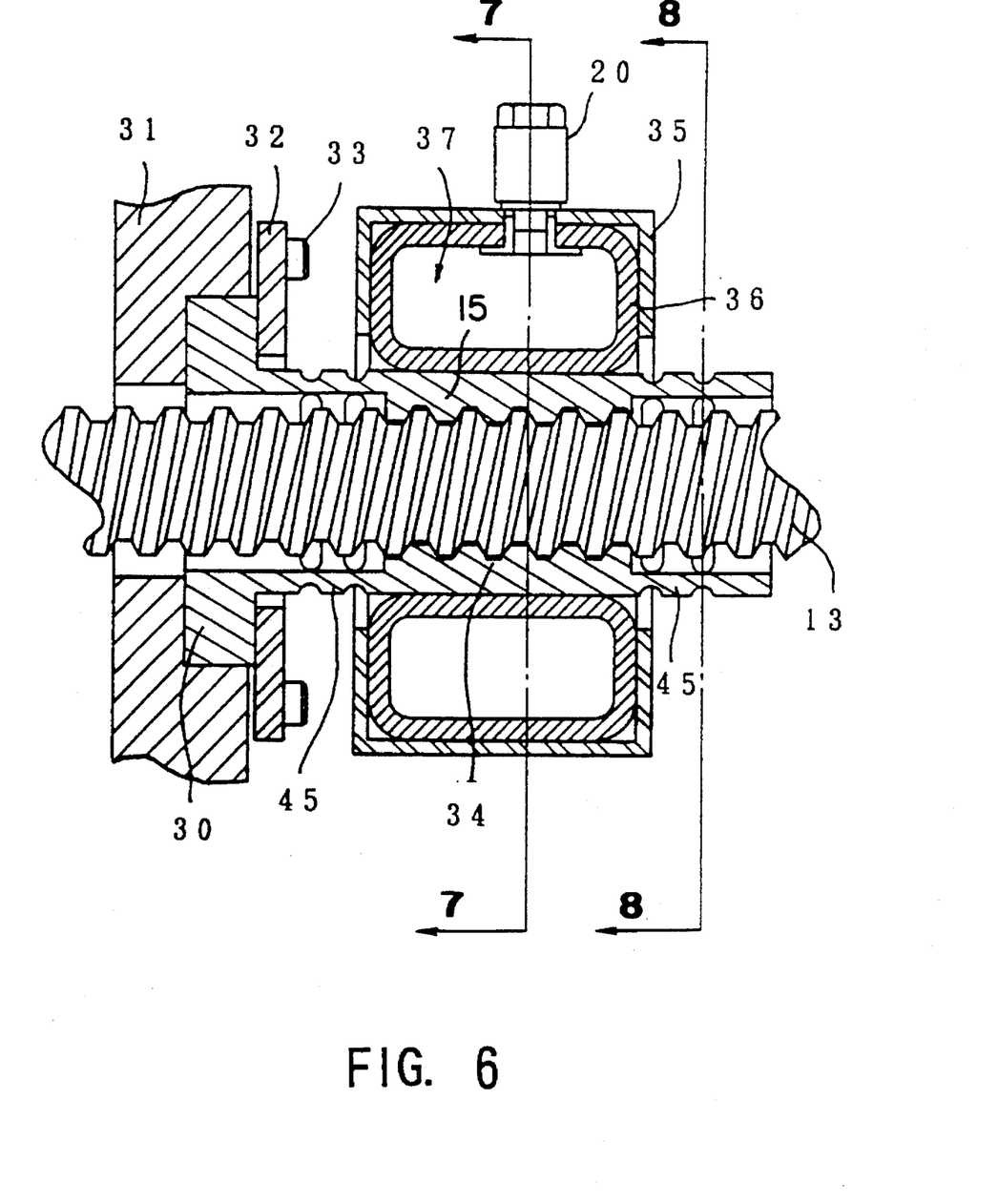
FIG. 6 is a sectional view showing a third embodiment of the present invention.
Figure 7:
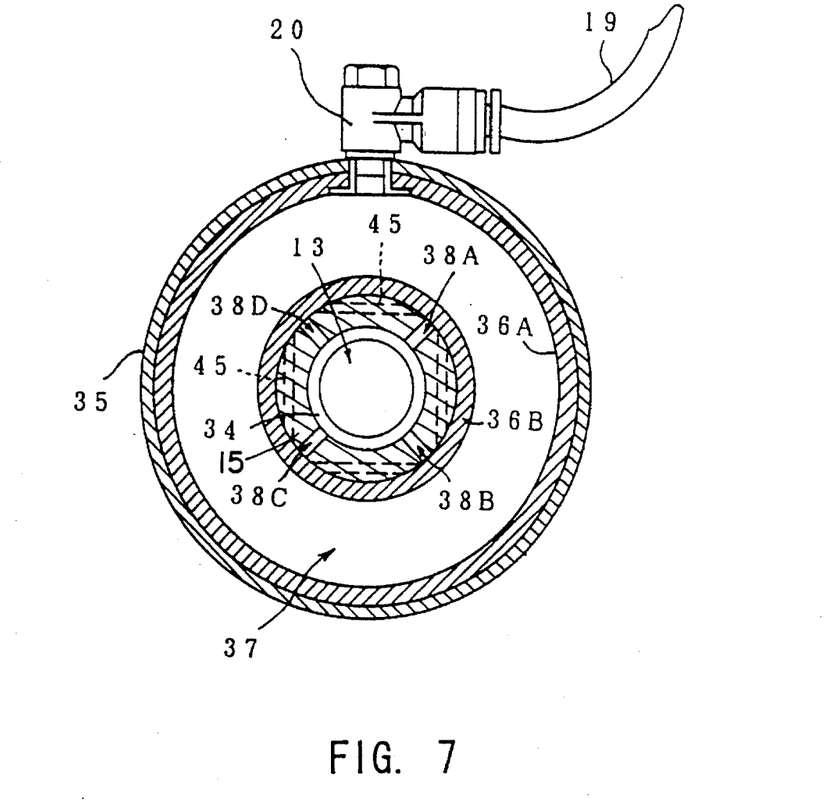
FIG. 7 is a sectional view showing a section as taken along section line 7—7 of FIG. 6.
Figure 8:
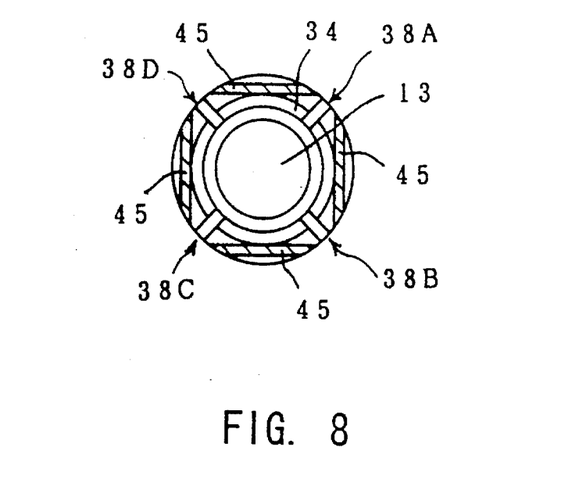
FIG. 8 is a sectional view showing a section as taken along section line 8—8 of FIG. 6.

In the above embodiments, the female thread 34 and mounting flange 30 of the feed nut 15 are coupled with each other by means of the coupling part 39 alone, so that the influence of rigidity of the mounting flange 30 upon the female thread 34 can be minimized and the female thread 34 can be easily deformed to the extent of corresponding to a pressure applied by the pressurizing member 36. However, this invention is not only limited to this, but as shown in FIGS. 6 to 8, the female thread 34 and mounting flange 30 may be coupled with each other by means of a blade spring hinge 45. Even in this variant, the female thread 34 can be easily deformed to the extent of corresponding to a pressure applied by the pressurizing member 36. As shown in FIG. 7, the number of slots 38 bored on the female thread 34 is not only limited to one. A plurality of slots 38A to 38D may be machined. With the presence of a plurality of slots, the female thread 34 can be deformed more easily to the extent of corresponding to an extent of pressurization.

Figure 9:
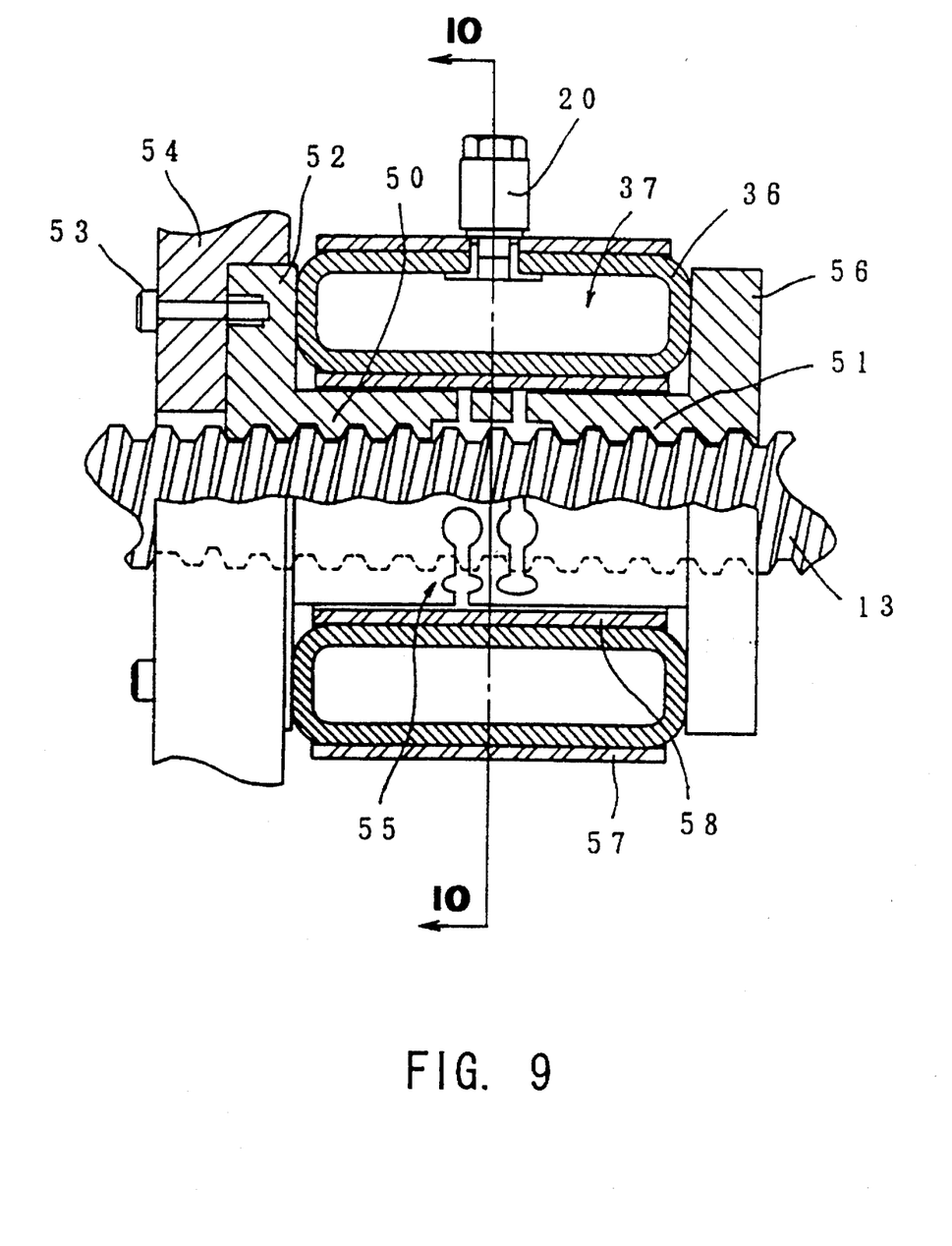
FIG. 9 is a sectional view showing a fourth embodiment.

In the above embodiments, the female thread 34 formed as part of the feed nut 16 is deformed in the radial direction of the female thread by means of the pressurizing member 36. However, this invention is not only limited to this, but as shown in FIG. 9, the female thread 34 (FIG. 2) may be divided into two sections: first and second female threads 50 and 51.

Figure 10:
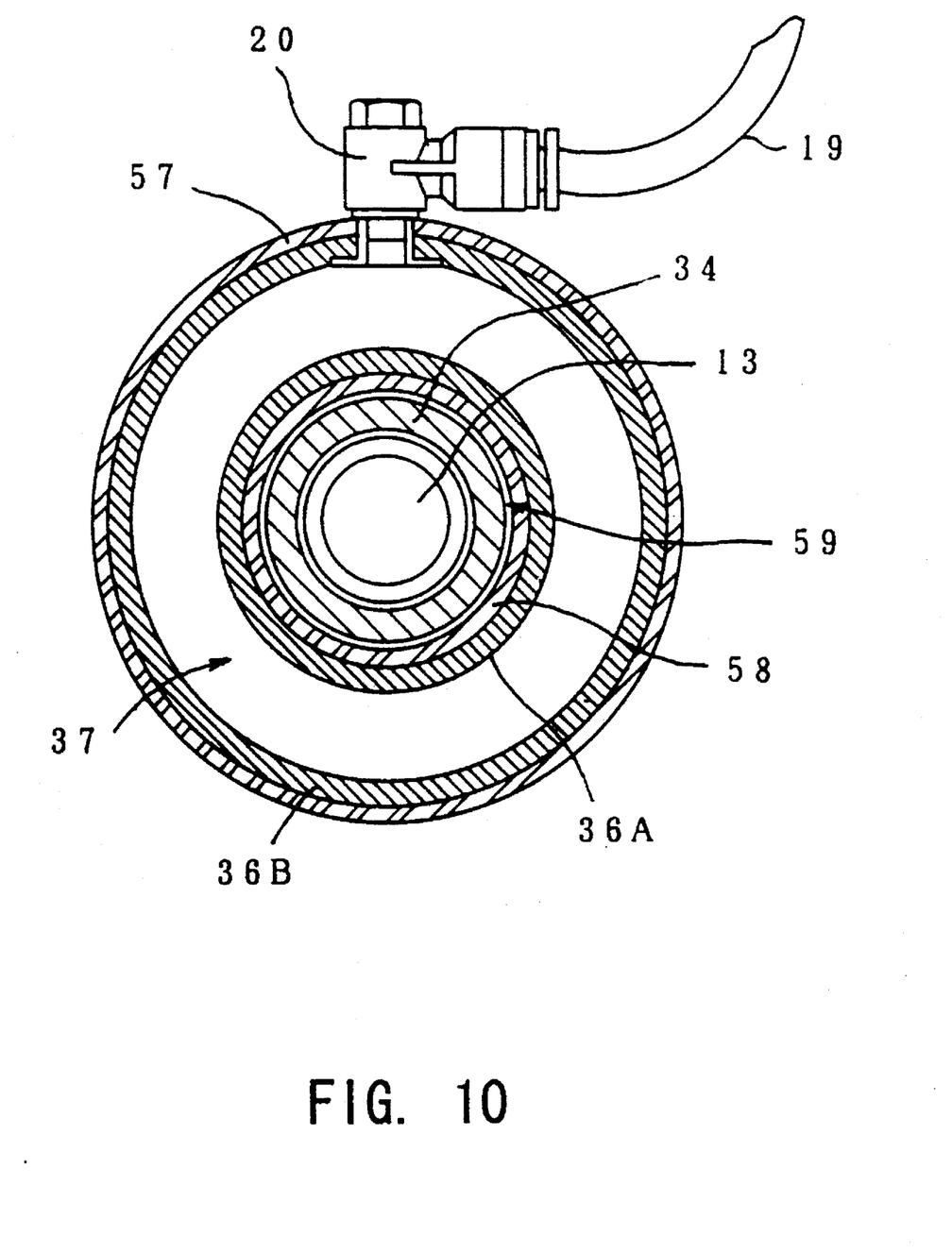
FIG. 10 is a sectional view showing a section as taken along section line 10—10 of FIG. 9.

In this case, a mounting flange 52 of the first female thread 50 is fixed to a nut mounting part 54 with a screw 53. The first and second female threads 50 and 51 are coupled with each other by means of a blade spring hinge 55 so that they are displaced only in a direction parallel with the axis of the feed screw 13 without making a relative rotation. The tube-like pressurizing member 36 is stowed in guard rings 57 and 58 each having both ends opened in the axial direction of the feed screw 13. When fluid is led to the hollow 37 via the coupling 20, the pressurizing member 36 is restrained from dilating in the inner and outer radial directions thereof by the guard rings 57 and 58, but dilated only in a direction parallel with the axis of the feed screw 13. As a result, the pressurizing member 36 pressures the mounting flanges 52 and 56 of the first and second female threads 50 and 51, and thus forces the first and second female threads 50 and 51 to separate from each other. Consequently, the interface between the feed screw 13 and the first or second female thread 50 or 51 can be pressurized to a desired extent.

In the above embodiments, the feed screw 13 or feed nut 15 has a trapezoidal thread. However, this invention is not only limited to this, but a ball thread may be adopted for the feed screw 13 or feed nut 15.

In the above embodiments, the feed nut 15 is supported by the coupling member 14 so that it will not rotate, and the feed screw 13 is supported by the bearing 12 so that it can rotate freely. However, this invention is not only limited to this, and as long as a feed screw and a feed nut make a relative rotation to achieve linear displacement, either the feed screw or feed nut may rotate or move linearly. The advantages mentioned above are still available.

For example, a rotation drive means and a feed screw may belong to a movable unit. The feed screw held with a bearing supported the movable unit may rotate, and a feed nut engaged with the feed screw may be supported by a stationary unit so that it will not rotate. Alternatively, a feed screw may be supported by a movable unit so that it will not rotate, and a feed nut that is held with a bearing so as to be rotatable may be rotated by a rotation drive means while being supported by a stationary unit.

While there has been described in connection with the preferred embodiments of the invention, it will be obvious to those skilled in the art that various changes and modifications may be made, therefore, the present invention is limited only by the appended claims which cover all such changes and modifications as fall within the true spirit and scope of the invention.

What is claimed is:

1. A positioner comprising:

a feed screw;

a feed nut threadedly engaged with said feed screw;

slot means formed in said feed nut for rendering said feed nut resiliently flexible in a diametrical direction; and a pressure control means including fluid chamber means disposed about said feed nut for applying a force which flexes said feed nut inwardly and increases the pressure applied to said feed screw by said feed nut.

2. A positioner for rotating a feed screw by means of a given rotation drive means so that a feed nut engaged with said feed screw moves relative to and in the axial direction of said feed screw, and thus a driven part coupled with said feed nut is positioned in a desired position, comprising:

a pressurizing means disposed about said feed nut for applying a radially inward acting force on said feed nut which varies the diameter of said feed nut and increases the pressure applied to an interface between said feed screw and said feed nut; and a pressure control means for controlling the radially inward acting force so that the extent of said pressurization is set to a desired value.

3. The positioner according to claim 2, wherein:

said feed nut has first and second female thread portions which can freely approach or separate from each other in the axial direction of said feed screw, and wherein, when said pressurizing means applies the radially inward acting force to vary the force applied to the interface between said feed screw and said feed nut, said pressurizing means includes means for simultaneously applying a force to said first and second female thread portions which causes the axial distance between said first and second female thread portions to vary.

4. A positioner according to claim 2, wherein said feed nut is slotted in a manner which facilitates a change in diameter in response to the application of said radially inward acting pressure exerted by said pressurizing means.

5. A positioner for rotating a feed screw by means of a given rotation drive means so that a feed nut engaged with said feed screw moves relative to and in the axial direction of said feed screw, and thus a driven part coupled with said feed nut is positioned in a desired position, comprising:

a pressurizing means for pressurizing an interface between said feed screw and said feed nut by pressuring said feed nut in a given direction; and a pressure control means for controlling pressurization so that the extent of said pressurization is set to a desired value; wherein said feed nut has at least one slot which extends in the radial direction of a female thread and extends along at least a part of said feed nut, said pressurizing means is an elastic tube, and the pressurizing of the interface between said feed screw and said feed nut is controlled by varying the diameter of said feed nut by varying a pressure of fluid in the elastic tube.

* * * * *